Jan. 16, 1951 G. TOUVET 2,538,063
SEARCH AND ORIENTATION SYSTEM
Filed July 11, 1946 7 Sheets-Sheet 1

*INVENTOR.*
GUY TOUVET
BY
*M.O.Hayes*
ATTORNEY

Jan. 16, 1951  G. TOUVET  2,538,063
SEARCH AND ORIENTATION SYSTEM
Filed July 11, 1946  7 Sheets-Sheet 3

INVENTOR.
GUY TOUVET
BY
ATTORNEY

Jan. 16, 1951  G. TOUVET  2,538,063
SEARCH AND ORIENTATION SYSTEM
Filed July 11, 1946  7 Sheets-Sheet 4

Inventor
GUY TOUVET

Jan. 16, 1951        G. TOUVET        2,538,063

SEARCH AND ORIENTATION SYSTEM

Filed July 11, 1946        7 Sheets-Sheet 6

Inventor
GUY TOUVET

By M. O. Hayes
Attorney

Jan. 16, 1951  G. TOUVET  2,538,063
SEARCH AND ORIENTATION SYSTEM
Filed July 11, 1946  7 Sheets-Sheet 7

Inventor
GUY TOUVET,
By
ATTORNEY

Patented Jan. 16, 1951

2,538,063

UNITED STATES PATENT OFFICE 2,538,063

SEARCH AND ORIENTATION SYSTEM

Guy Touvet, Orleans, France

Application July 11, 1946, Serial No. 682,957

35 Claims. (Cl. 343—101)

This invention relates in general to improvements in systems for orienting two distantly located stations, and is more particularly concerned with a system for searching and mutually orienting after contact such stations through the agency of projectors and semi-directional receivers utilizing infra-red or other radiation visible or invisible to the naked eye after orienting the stations mutually, the system maintains a transmission contact between the two stations independently of any directional properties of the receiving means. It will be apparent from the following specification that the same system and devices are useful for other remote control applications.

The transmission of intelligence by visual light is an old and well-known practice in the communication art. With visible light transmission, it is a comparatively simple matter to keep the light beams properly oriented between the sending and receiving stations. However, such transmissions do not provide a desirable security from interception for the messages or signals being transmitted.

More recently, progress has been made in increasing the security of transmission by the utilization of a system in which the intelligence is imposed on the radiation as a modulation, the radiation being on a wave length that is invisible to the naked eye. Such a system providing markedly greater security, efficiency, dependability and modulation control is disclosed in my co-pending application, Serial No. 645,626, filed February 5, 1946. The utilization of the present searching and orientation control system with the invention disclosed in the above application is particularly advantageous from the standpoint of security and reliability, and when the stations utilizing my improved transmission system are in rapid relative motion and have random roll and pitch motions such as might be encountered when the stations are located on board ships.

One of the important advantages of the present orientation system is that it is absolute, that is, it leaves nothing to chance and does not depend on probability under even the most difficult conditions of operation.

It is a primary object of the present invention to provide an orientation control system which takes advantage of unique characteristics of the transmitted beam of radiation, whereby two distantly located stations may be maintained in communication contact under even extremely adverse conditions.

Another object of this invention is to provide an orientation search and control system capable of rapid search in all directions, more particularly of the entire horizon, and equally rapid lock-in relationship with another station, when the radiation transmitter-receiver systems of the stations make contact.

A further object of the invention is to provide an orientation system for a light communication or navigation system where change-over from continuous search to lock-in control, and maintenance of contact while locked-in contact, are achieved by the utilization of special and unique characteristics of the radiation beam of the communication or navigation system.

In the attainment of the foregoing objects, the invention in its broad aspects includes directional stations, each of which has a transmitter and receiver which operate during normal searching in such manner that the axis of the receiver and the axis of the transmitter are rotated through azimuth angles at different rotational speeds, the speed of the receiver being, for example, greater than that of the transmitter. With such an arrangement, it will be apparent as explained later that in the case of two mutually searching stations, and due to the breadth of the beam angles there will always be a time in which the receiver at one station will have its beam of reception in general coincidence with the beam of transmission from the distant station.

A control mechanism is provided at each station, which will operate to cause the stations to become locked-in. The contact having thus been established and a communication channel set up, the problem then becomes one of maintaining this contact.

In my present invention, the automatic orientation and maintenance of contact between the stations is accomplished in a unique manner. For such purpose, the radiation beam projector which I utilize is of such construction that the beam will have a plurality of component cross-sectional parts or sections, each section comprising radiation of one or more frequencies different from the frequencies of adjacent sections of the beam. The main portion of the beam provides the frequency which is modulated or otherwise affected for the transmission of intelligence thereover. Segmental sections of different frequencies are disposed in angular relation and are usually arranged in quadrature about the periphery of the beam and utilized for affecting suitable mechanism in the receivers at the respective stations to change the angular relation between the directional axis of the transmitter beam at one station and the beam received at this station from the transmitter of the other station in such direction as to cause mutual orientation of the stations and maintain them in contact at all times.

During this operation of mutual orientation, the receivers at each station make no use of any directional properties which they may have, so that non-directional receivers operate as well as directional receivers. Operation does not depend upon the orientation or direction in which the receiving means at a station is pointing, but rather upon the location of that station, and more specifically, of the receiving means of the station, in the received beam with respect to the center of the beam. In other words, since the beam is divided cross-sectionally into various zones, each carrying different frequencies, the operation depends upon the particular frequency received by the receiver. Obviously, with such an arrangement, the particular frequency received depends upon the cross-sectional portion of the beam which strikes the receiver. Directional properties are desirable for search operation only, and it should be understood that any directional properties of the receiving means are not utilized in the mutual orientation system. This orientation control can be effective both as to azimuth angles and vertical angles taken either singly or both in the same system. For instance, in the case of ships, control as to azimuth angles may be sufficient assuming a wide enough beam to take care of roll and pitch.

Still other objects and advantages of my invention will appear from the following specification and the accompanying drawings.

The features of novelty which I believe to be characteristic of my invention are set forth with particularity in the appended claims. My invention itself, however, both as to its fundamental principles and as to its particular embodiments will best be understood by reference to the specification and accompanying drawings, in which:

Figure 1:
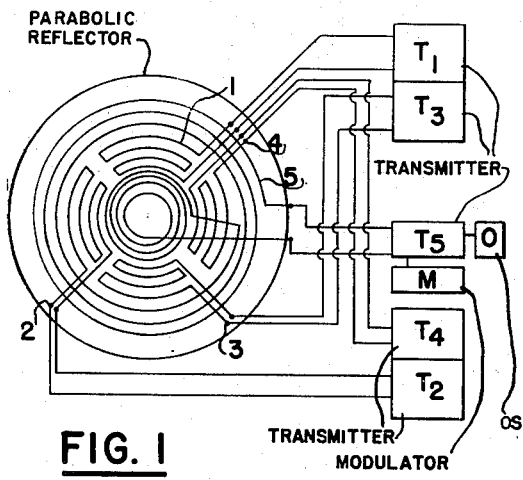
Figure 1 is a schematic view of a transmitter assembly and transmitting tubes for providing a beam having certain cross-section characteristic.

Referring to Figure 1, there is shown a transmitting tube assembly as used in the transmitting stations of the present invention. A plurality of transmitters T—1, T—2, T—3, and T—4 are utilized to excite or induce auto oscillations of light discharge tubes 1, 2, 3, and 4, in the infrared or other invisible radiation region, respectively, of the tube assembly at frequencies F—1, F—2, F—3, and F—4, all of which are frequencies which serve to control the energization of relays as will be explained presently. Another transmitter T—5 is utilized to excite a light discharge tube 5 at a frequency F—5, which is the main or communication frequency of the system.

This assembly of tubes 1, 2, 3, 4, 5, is conveniently placed at the focus of an optical system such as a parabolic mirror of the transmitter. The section of the transmitted beam is, therefore, the reversed image of the focus plane constituted by the transmitting tube assembly at the focus of the optical system of the transmitter.

The tubes 1, 2, 3, and 4, are arranged in sectors, as shown, so as to provide a composite radiation beam having different modulation frequencies in the respective sectors. The control tube 5 is arranged in a central spiral or stack of spirals and in a ring outside of the tubes 1, 2, 3, and 4, so that a portion of the radiation with modulation at frequency F—5 may be picked up even in an off-center control area of the beam.

The above constitutes a simplified arrangement, since in practice gas containing tubes 1, 2, 3, and 4 are located in front of or behind the tube 5. Tubes 1, 2, 3, and 4 are transparent to the radiations produced because of the broadening of the ray spectrum into bands and because of the forced radiation of the gas described in my aforementioned patent application Serial No. 645,626. With such a stacked arrangement, the frequency F—5 may be picked up in the segmental control or orienting areas along with the control frequencies.

The shapes of the tubes utilized to emit the control portions of the beam determine the shapes of the beam zones or sections in which the corresponding frequencies are located. A ring-shaped section in the beam at the outer limit of a given zone is sufficient to cause the energization of the holding circuits of the relays, in which case the control signal discharge tubes comprise mere arcs. On the other hand, it may be useful in certain cases to cover a complete sector with a given control frequency and in such case the transparency of the tube to the radiation is taken advantage of in superimposing or stacking tubes.

Figure 2:
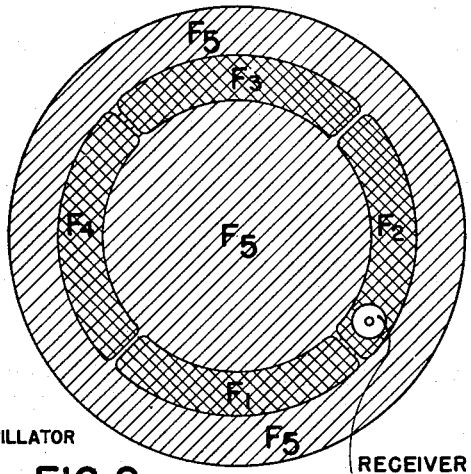
Figure 2 is a cross-section of the beam of radiation projected on the plane of the beam's interception with a receiver.

The component parts of an exemplary composite radiation beam are more clearly illustrated in Figure 2 which is a cross-section of the beam as it would appear when received at the receiver of a station. It will be clear from this figure that a different frequency will be received according to the portion of the beam that is intercepted by the receiver.

Each station will be understood as having a receiver assembly and a transmitter assembly.

The pick-up or receiver at each station may be of conventional construction and may comprise a plurality of receiving cell pick-ups all of which receive at the same time that portion of the transmitted beam picked up by the receiver or the receiver may comprise a single receiving cell connected to multi-channel outputs in a manner described in my aforementioned application. Thus, only one optic can be sufficient at the receiver.

Figure 3:
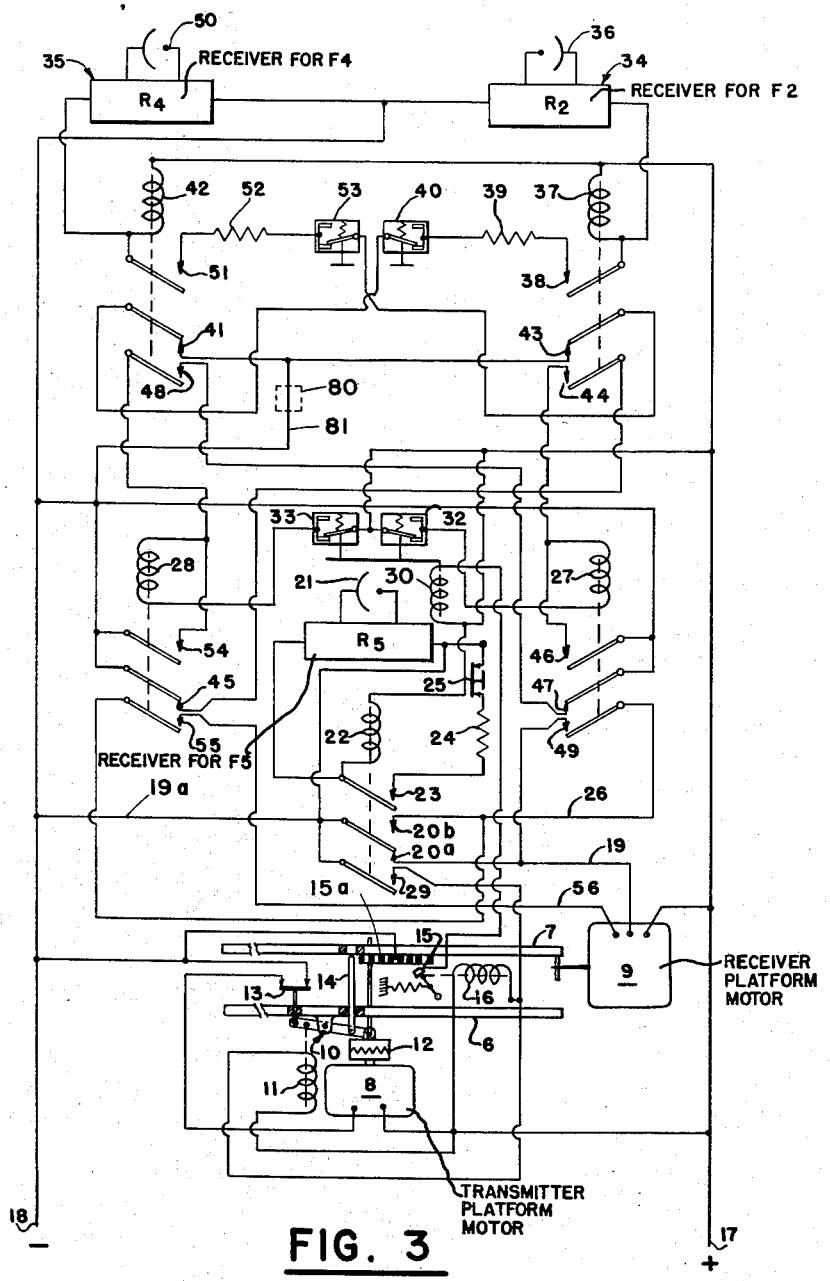
Figure 3 is a view schematically showing the circuit connections of the component parts of the searching and orientation control system in a preferred embodiment of my invention.

In order to provide for the two distinct phases of operation of the present invention, the searching operation and the orienting operation, the transmitter and receiver are respectively mounted on rotatable platforms 6 and 7 as schematically illustrated in Figure 3.

It should be noted, however, that it is not necessary to have the whole receiver and transmitter mounted on the rotating platforms. The rotation may well be applied only to a part of the optical systems; for example, to a plane mirror positioned at a 45 degree inclination so as to reflect the beam from the transmitter or to the receiver depending upon which is involved. The remainder of such a device would be the same as if the entire device were rotated and would accomplish a saving in weight and inertia of the revolving parts. The words "transmitter" and "receiver" are utilized herein with the above distinction in mind, and it is the intent that these two words may refer to that part of the entire transmitter or receiver by which the projected and received beam directions are determined. In considering the following descriptive matter, it should be kept in mind that the receivers utilize any directional properties which they may have only during search operation, but that during the mutual orientation operation which follows searching, the receivers operate depending upon the characteristic frequency which they receive, so that they may be considered as being non-directional during their operation in the mutual orientation phase of operation.

The transmitter platform 6 is driven by an electric motor 8 arranged for continuously rotating the platform in one direction at a speed $$\frac{W}{10}$$

The receiver platform 7 is driven by a motor 9 of the reversible type so that it is able to drive the platform in a clockwise or counter-clockwise direction during orientation operation. During search, the platform 7 is normaly rotated at a speed, for example, ten times that of the transmitter platform; that is, a speed of W. The speed ratio of the transmitter and receiver platforms depends mainly on the width of the beam angles, especially that of the transmitter; on the relative speed of the two stations; and on their distance apart. In most cases, a ratio of ten is satisfactory. It will be clear that the receiver must pick up at least a portion of the transmitted beam in a single revolution of the receiver. Therefore, it is necessary to select the receiver and transmitter speeds of rotation during search according to the magnitude of the beam angles. Because of the large beam angle which results from using the type of transmitter tube I have disclosed in my above mentioned co-pending application, the ratio of ten is sufficient to cause the receiver to make one complete revolution during the time it is being touched by the moving transmitted beam from another station.

With any correctly selected speed ratio of the transmitter and receiving platforms, it will be understood that during a searching operation, the receiver at one station will always pass through a point in which its beam of reception will substantially coincide with a portion of the beam transmitted from a distant station. The same will happen for both stations. When two stations thus make contact, during a searching operation, a control system which will be described in detail subsequently, is actuated and causes the transmitter and receiver at each station to become locked-in, that is, to revolve together. Thereafter the operation at the respective stations becomes one in which the two stations are maintained in contact by a mutual orienting operation to be described later in detail. In other words, as soon as contact is established between the transmitter of a distant station and the local receiver on platform 7, means are provided for locking the local transmitter platform 6 and local receiver platform 7 together for rotational movement at the same speed, and in such a way that the optical axes of the transmitter and receiver are parallel and pointing in the same direction. The transmitter on platform 6 is thus aimed in the direction of the received signal, that is to say in the direction of the distant station, after a slight delay, the necessity for which will be explained presently. A similar lock-in operation occurs at the distant station.

Figure 11:
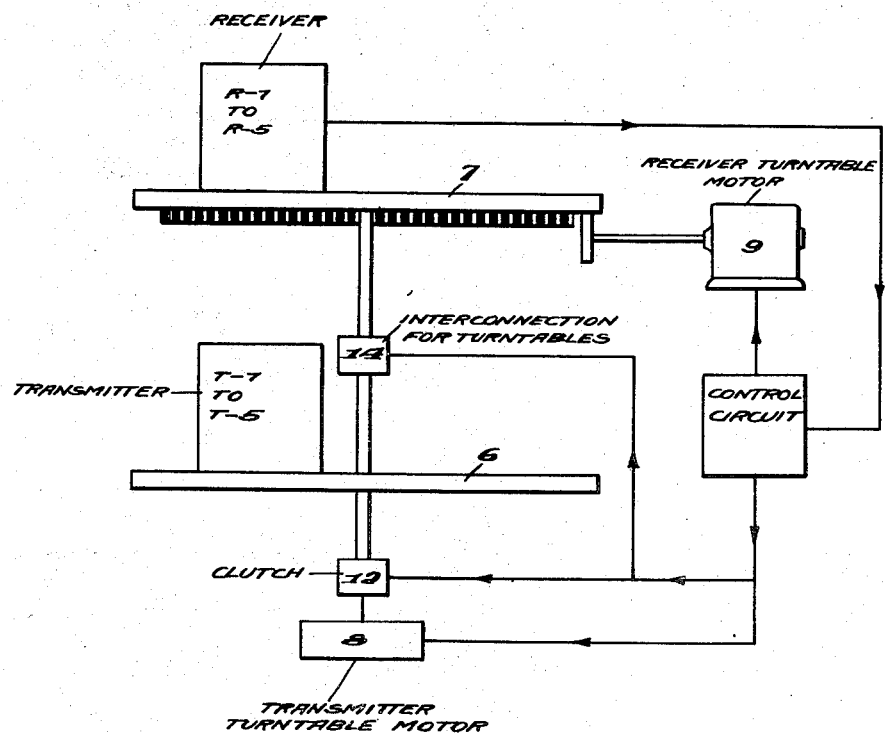
Figure 11 is a schematic diagram similar to Fig. 3, but showing a transmitter and a receiver mounted on their respective turntables.

As schematically shown in Figures 3 and 11, the interlocking of the platforms may be accomplished by means of an electrically actuated mechanism as generally indicated at 10. This mechanism includes an actuating coil 11 which is energizable to simultaneously release a clutch 12 to disconnect the motor 8 from driving connection with platform 6, to open the power supply to the motor 8 by opening contacts 13, and to raise an interlocking pin 14 into engagement with platform 7.

The interlocking of the platforms could very well be electrical instead of mechanical without departing from the invention. For instance, use could be made of Selsyn or other similar devices which would maintain the optical axes of the transmitter and receiver at a given station parallel and pointing in the same direction during rotational motion.

Platform 7 is provided with a movable brush-like contact 15 which is controlled by an operating coil 16 for movement between a raised position for successive contact by spaced conducting segments of a disc 15a and lowered position clear of the conducting segments for a purpose to be explained subsequently in detail.

Referring further to Figures 3 and 11, the interconnections of the control elements constituting my novel searching and orientation system, are shown in detail. The power source is indicated as supplying conductors 17 and 18, respectively, constituting the two sides of the power source.

When a station is not in contact with a distant station, the receiver platform 7 is driven continuously in one direction as previously explained for the searching operation. Under such conditions, the motor 9 is operated in a given directon, for example, a counter-clockwise direction, the motor energizing circuit being from conductor 17, thence through conductor 19, contacts 20a and line 19a to conductor 18.

Let it be assumed that a distant station projects an appropriate beam of radiation, for example infra-red, from its transmitter, this distant station being in searching operation with its beam being rotated continuously as previously described. When the receiver platform of the local station swings its receiver through the bearing of the distant station, pick-up 21 activates receiver R—5 for the reason that frequency F—5 has been received. Receiver R—5 energizes a relay 22 to close its contacts 23 and complete a holding circuit through a limiting resistor 24 and normally closed contacts of a switch 25. At the same time, contacts 20a are opened and contacts 20b are closed to shift the return connection 19a of the motor from connection with conductor 19 to connection with conductor 26, thereby stopping the continuous rotation of the receiver by the motor 9 which has been causing search of the whole horizon, and shifting the motor rotation control to relays 27 and 28. Also, contacts 29 are closed to complete energizing circuits to coils 11 and 16 of the electro-mechanical devices previously described in connection with the transmitting platform and receiver platform, respectively.

Platforms 6 and 7 will thus become locked together when in coincidence after a short delay so as to rotate together at the same speed, namely, the speed of platform 7, with the transmitter and receiver axes parallel and pointing in the same direction. The movable brush-like contact 15 is moved to its raised position by the energization of coil 16 for successive contact by the conducting segments of disc 15a, as previously described, during rotation of platform 7. The conducting segments are connected to conductor 18 and contact 15 is connected to a coil 30 which, through a mechanical linkage operates movable switch arms of switches 32 and 33. The other side of the coil 30 is connected to conductor 17.

It will be noted that switches 32 and 33 each comprise two spaced contacts connected to one lead and a movable arm connected to the other lead so that the switch is closed when the arm is in contact with either of the two spaced contacts, and is open only when the arm is moving from one fixed contact to the other fixed contact. The arm is spring urged into contact with the lower of the two spaced contacts and only moves upwardly into contact with the upper contact when so moved by the energization of coil 30. This movement of the movable contact momentarily breaks the circuit at switches 32 and 33 for a purpose which will be explained presently. It is apparent that the movable switch arms of switches 32 and 33 cannot remain in an intermediate position and a continuous circuit through switches 32 and 33 is maintained except during the momentary breaking of the circuit as explained above. The system is now in a condition for orientation control which is governed by selective control circuits generally indicated at 34 and 35. Circuit 34 operation will cause counter-clockwise rotation of motor 9, and circuit 35 will cause clockwise rotation.

Let it now be assumed that the receiver pickups are in a portion of the received beam which is modulated at frequency F—2. Pick-up 36 will activate receiver R—2 which will cause the actuating coil of relay 37 to be energized. This relay will now operate to close its contacts 38 and complete a holding circuit through limiting resistor 39, the contacts of switch 40, and normally closed contacts 41 of relay 42. Energization of relay 37 also causes it to open its normally closed contacts 43 in the holding circuit of relay 42. At the same time, contacts 44 are closed to complete part of the energization circuit of relay 27.

The operating coil of relay 27 is energized through the following circuit: From conductor 17 through the contacts of switch 32 to one terminal of the actuating coil of relay 27, from the other terminal of this coil through the contacts 44 of relay 37 and thence through contacts 45 of relay 28 to conductor 18. As soon as relay 27 is actuated, its contacts 46 are closed to complete a holding circuit for maintaining the relay energized connected directly with conductor 18. At the same time, contacts 47 are opened to prevent completion of an energizing circuit to actuate relay 28 in the event that relay 42 should become actuated and should thereby close its contacts 48. Further, contacts 49 are closed to energize motor 9 for counter-clockwise rotation through the following circuit: From conductor 17 to one terminal of motor 9, from the other terminal of the motor through conductor 19, contacts 49, conductor 26, contacts 20b, and thence to conductor 18. It will be recalled that relay 22 was energized to close contact 20b upon the reception of frequency F—5 by pick-up 21 which thereupon actuated receiver R—5 as explained above.

Reception of light in the sector of the beam modulated at frequency F—4 will cause pick-up 50 to actuate receiver R—4 which will, in turn, cause the operating coil of relay 42 to be energized. As explained previously herein, the presence of directional properties in the receivers at this stage of the operation is unnecessary Operation of this relay will cause its contacts 51 to close and complete a holding circuit through a limiting resistor 52, the contacts of switch 53, and contacts 43 of relay 37. At the same time contacts 41 open to interrupt the holding circuit of relay 37. Also, contacts 48 of relay 42 are closed to complete part of the energizing circuit of the operating coil of relay 28 through the following circuit: From conductor 17 through the contacts of switch 33 to one terminal of the operating coil of relay 28, from the other terminal of this coil through the contacts 48 of relay 42 and thence through contacts 47 of relay 27 to conductor 18 the other side of the power circuit. Assuming relay 27 is not energized and contact 47 is closed, relay 28 closes, causing its contacts 54 to close to complete a holding circuit connection directly with conductor 18 so as to maintain relay 28 energized regardless of the condition of contacts 47 and 48. Energization of relay 28 also opens contacts 45 so as to prevent energization of relay 27 in the event that contacts 44 of relay 37 should become closed by the reception of frequency F—2 by pick-up 36 with the subsequent energization of relay 37. Contacts 55 will also be closed by the actuation of relay 28, and serve to connect motor 9 for clockwise rotation through the following circuit: From conductor 17 to one terminal of the motor, from the other terminal of the motor through conductor 56, contacts 55 of relay 28, and thence through contacts 20b to conductor 18 of the other side of the circuit.

The clockwise or counter-clockwise rotation of motor 9 will continue until switches 32 and 33 are momentarily opened by energization of coil 30 and due to the co-operation of brush contact 15 with the segments of disc 15a carried by the platform 7. The system now proceeds to re-establish coincidence in orientation of the directional transmitter beam with the receiver by a step-like movement of the directional transmitters and receivers at the two stations, each step comprising a pre-determined angle of movement. This angle is determined by the position of the conducting segments of disc 15a which energize coil 30 to intermittently open switches 33 and 32 for short periods of time. Switches 33 and 32 are actuated simultaneously. They open and close in an extremely short time, the duration of which is just long enough to open the energizing circuits of relays 28 and 27 each time the platforms have turned through a pre-determined angle in either direction. It will be observed that the direction controlling relays 37 and 42 are electrically interlocked as described above in such a manner that if they should be closed in succession, the last relay closed would de-energize the first relay. The last relay to be operated would, therefore, control the final direction of rotation of the motor. As the system is periodically interrogated by momentary opening of switches 32 and 33 each time the platform turns through a given angle, it will be apparent that the holding circuits through relays 27 and 28 will momentarily be interrupted periodically and whichever of these relays is closed will be de-energized and will drop out. Upon re-establishment of the circuit at switches 32 and 33, the relays 27 and 28 will be selectively reclosed depending upon whether the conditions are such as to maintain relay 37 or 42 in closed position.

The above described interdependence of relays 27 and 28 so that they can operate only one at a time is important due to the fact that it is desirable that either relay 37 or relay 42 can be energized with the resulting closing of contacts 48 and 44 at any time without interfering with the state of motion of the platform which prevails at the instant relay 37 or relay 42 is energized.

Control circuits 34 and 35 of the local station are so interconnected that orientation is normally toward the center of the beam emitted from the distant station. The corresponding control circuits of the distant station also orient its transmitter toward the center of the beam emitted from the local station. As the projected beam sweeps over pick-ups 36 and 50, or as the beam swings away from a bearing on the receiver of the local station, the pick-up 36 or 50 that is last actuated with light modulated with its particular frequency will retain control and will determine the direction of motor operation. For instance, if the continuous clockwise rotation carries a beam across a receiver before relay 22 can carry out its function of shifting from orientation operation to search operation, frequency F—4 will be the last control frequency to actuate and control the direction of rotation on the motor 9 and relays 42 and 28 will remain in control at least until the next actuation of switches 32 and 33 by coil 30.

If, at the time of the next actuation of switches 32 and 33 by coil 30, the pick-up 36 has not been energized by reception of frequency F—2 since the last energization of pick-up 50, then relays 42 and 28 remain in control due to their holding circuits and, during the next ensuing period between energizations of coil 30, the platform continues moving in the direction in which the operation of the switches controlled by relays 42 and 28 causes it to move.

But if, at the time of next energization of coil 30, the pick-up 36 has been the last one energized, that is, pick-up 36 has received frequency F—2 subsequent to the last reception of frequency F—4 by pick-up 50, then relays 37 and 27 take over control of the operation of the platform during the next ensuing interval between energizations of coil 30 and the resulting momentary opening of switches 32 and 33. This operation by steps of rotation caused by the intermittent opening of switches 32 and 33 co-operating with the holding circuits of relays 42 and 37 is important in case the beam sweeps rapidly from one side to the other and back due to the action of exterior influences such as roll and pitch of the ship, and serves to damp the entire operation. This is also important in case the beam switches so fast from one side to the other that the operating coils of the relays 28 and 27, which have holding circuits through contacts 54 and 46, have no time to interchange. Another reason, which will be explained later, is to be able to establish and maintain more easily the contact between two distant stations which are in motion.

As the transmitter beam and the angle of reception of the receiver at each station are now locked together with their axes parallel and pointing in the same direction, if the angle of one step movement is smaller than the angle of reception of the receiver, and if the control zones in the transmitted beam are so disposed as to be entirely covered or included within the angle of reception of the receiver, it is evident that the receiver at each station will behave as if it were completely non-directional. Thus, the use of this step-like movement is important in that this movement permits the use of a directional receiver, but eliminates any effect of the directional properties of the receiver during orientation, and as long as the beams of the two transmitters have a common path.

Figure 11 shows Figure 3 reduced to schematic form with the control circuit of Figure 3 lumped into a block receiving signals from the receiver, and controlling motors 8 and 9, clutch 12, and interconnecting means for the turntables including pin 14.

In such a system as that just described, the optics of the system would be always in motion during the time that the contact of the communications and transmission of intelligence is maintained. By means of the mechanism to be described now, the operation may be arranged so that neither relay 42 nor 37 is energized in case the receiver is located in the central part of the transmitted beam from the other station. Contacts 40 and 53 are provided which open the energizing circuits of the relays 42 and 37 at regular intervals greater than twice the period between the intermittent opening of switches 32 and 33 by coils 30. This periodic operation can be accomplished by any conventional means such as a bimetallic element or by an arrangement similar to the means for operating switches 32 and 33 and utilizing a second ring of spaced conducting segments on the bottom of platform 7. Contacts 40 and 53 open and close the lock-in circuit as quickly as possible, to determine whether or not there is any current in the relays 42 or 37. In case the beams are in coincidence then only frequency F—5 is received and the energizing circuits of both relays 42 and 37 are open. This is due to the fact that neither F—2 nor F—4 is being received by pick-ups 50 or 36 and hence relays 42 and 37 are not in operation. When contacts 48 and 44 are open, relays 27 and 28 are de-energized and motor 9 becomes de-energized as soon as the next opening of switches 32 and 33 occurs. This operation applies where the frequencies F—2 and F—4 extend to the outer periphery of the beam and are not present in the central portion of the beam which carries frequency F—5.

If desired, an additional relay indicated diagrammatically at 80 may be connected in the common return 81 of the energizing circuits of relays 42 and 37. This additional relay would be energized by another receiver similar to 36 and R—2 but tuned on a frequency F—5 (Figure 7a) only transmitted and received in the central portion of the transmitted beam. When energized, relay 80 opens the energizing circuits of relays 42 and 37 and stops motor 9. In this case, the control zones 1, 2, 3, 4, may extend nearer to the center of the beam than in the case where frequency F—5 and relay 80 are not used: Such a beam is shown in cross-section in Figure 7a.

The system just described operates to search and maintain contact in the horizontal plane only, but may be easily adapted for the vertical search and orientation. When both horizontal and vertical operations are required, a similar pair of pick-ups and control circuits including motors for moving the optics vertically are provided for vertical orientation, utilizing the modulations F—1 and F—3 in the beam's cross-section. The lock-in of the controls receiving the last modulation, so as to orient toward the center of the other station's beam, will occur as previously described for horizontal orientation; the control system for utilizing frequencies F—1 and F—3 being substantially the same as the system shown in Figure 3. A universal joint would be provided to take care of the combined horizontal and vertical movements.

Upon completion of a transmission and shutdown of the respective transmitters, switch 25 is actuated either manually or automatically to release relay 22 and thereby uncouple platforms 6 and 7. The system then returns to continuous search operation until another transmitter beam is received.

Switch 25, however, if automatically actuated must open only after a delay of a certain number of seconds after the signal has disappeared. This delay must be larger than twice the period during which a transmitter makes two revolutions, to avoid relay 22 being released before contact is obtained at both stations when searching on the whole horizon, both stations being in revolving motion. The manner in which contact between two stations is obtained and the reason for delaying the opening of switch 25 will be more clearly explained as follows: Assume, for example, a Station I and a Station II and that both transmitters and both receivers respectively of these stations are rotating at the required speed ratio. The receiver at Station I will receive the signal from the transmitter of Station II without difficulty, due to the above explained relation of the rotation speeds and beam width. The receiver of Station I stops in a position in which it is aimed at Station II as a result of relay 22 becoming energized; and the control systems of Figure 3 at Station I, which has received the signal, are immediately set working. The motor of the transmitter of Station I is only stopped when the transmitter is in coincidence with and locked in for rotation with the receiver of the same station. The maximum time necessary for this operation to take place corresponds to one complete rotation of the transmitter of Station I. This is so because relay 22 remains energized by its holding circuit and switch 25 is normally closed. If switch 25 is automatic, it is arranged so as not to open until after a delay period at least as great as the maximum total time for transmitter and receiver at each station to lock-in. Any conventional means such as a dashpot may be used to delay operation of switch 25. Now, the transmitter and receiver of Station I will follow the corrections fed to them by the control system so as to become aimed in the direction of the transmitter of Station II, the transmitter of Station I being already substantially aimed at Station II. The transmitter of Station II may still be in rotation. The receiver of Station II now receives the signal from the transmitter of Station I. The receiver of Station II stops in a position wherein it is aimed at Station I, and the control system of Station II causes orientation to maintain contact immediately, even though the transmitter of Station II has not yet become locked with the receiver of Station II so as to rotate therewith.

After a time, which at the most amounts to a complete rotation of the transmitter at Station II, the receiver and transmitter at Station II become locked-in and will rotate together as a unit. Thus, the contact between two stations is established within a time amounting at the most to the time required for two complete revolutions of a transmitter. In practice quite often the transmitter of a station is left locked-in with the receiver by maintaining switch 25 closed. This manner of operation is used by a station which has nothing to transmit, but merely wishes to be available in case it is called by another station. Should such station desire to call another station, the transmitter is released for independent rotation by opening switch 25. It will be understood that communication contact can be accomplished in a shorter time, if the transmitter and receiver of a station are already locked together at the time that station is called by another station.

Figure 4:
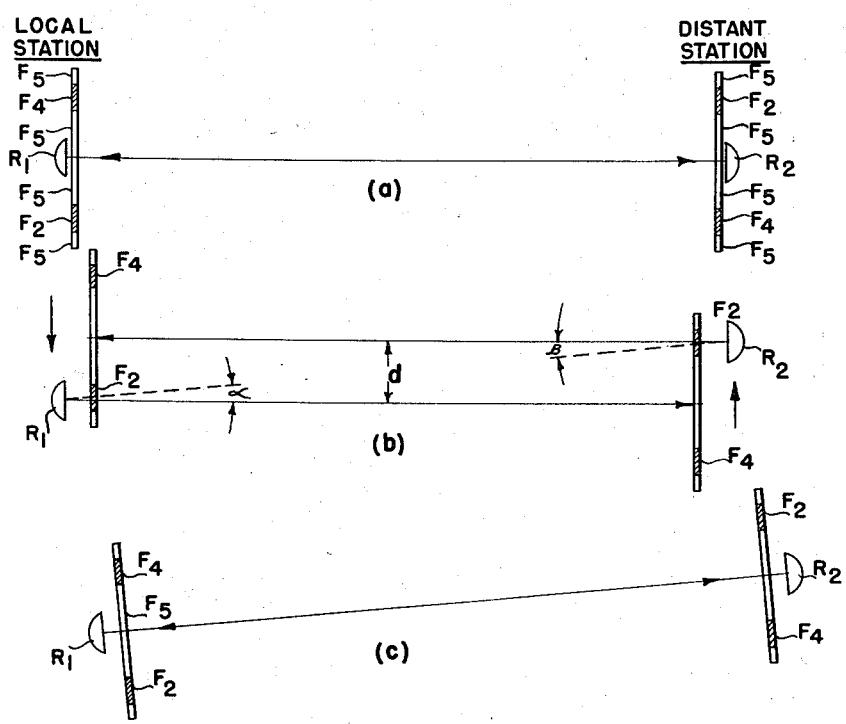
Figures 4a through 4c are plan views diagrammatically illustrating the use of the invention between two stations at three points in time and relative motion.

The manner in which a local and distant station may be mutually oriented in accordance with this invention, is more clearly shown in Figures 4a through 4c. In Figure 4a, the projected beams from the local and distant stations, respectively, are in substantial coincidence or locked-in relationship with the receivers R—1 and R—2 in the F—5 frequency sections of the beam at each station.

Assuming now that the local and distant stations have their transmitted beams laterally displaced a distance (d) as shown in Figure 4b. At the local station, the receiver R—1 is now in the section F—2 of the beam from the distant station and the receiver R—2 at the distant station is in the section F—2 of the projected beam from the local station. Since the stations have already made their initial contact and are operating to orient the local and distant stations and keep them oriented, the receiver and transmitter at each station will be interlocked for rotation together.

At the local station, the receiver and transmitter will be rotated by the operation of the control systems to move the transmitted beam axis through whatever angle $a$ is necessary to place the receiver at the distant station in the center section F—5 of its received beam, this to be accomplished in one or several steps of movement. At the same time, the controls of the transmitter and receiver at the distant station will move the axis of the projected beam through an angle β in response to the signal received from the projected beam from the local station so as to position the transmitted beam so that the receiver R₁ at the local station is in the center section F—5 of the beam received from the distant station. The beams from the stations are thus again brought into substantial coincidence as shown in Figure 4c. The same action takes place when the beams from the two stations are relatively displaced horizontally in an opposite direction, and likewise vertically displaced. That is, the action of the controls will always be such so as to re-establish coincidence of the beams and thus mutually retain the orientation of the two stations. The orienting operation takes place by one or more step-like movements and any displacement can be considered as a series of small lateral displacements which result in a series of small angular displacements similar to that illustrated by Figures 4a and 4c.

More generally, the operation of the system to maintain contact, i. e. orientation and communication, is also carried out for angular displacement by step-like angular movements. This procedure does not correct for every movement of the stations, but instead only corrects the position of the optics at predetermined time intervals corresponding to the period of time between successive energizations of coil 30 and therefore corrects for the last displacement which occurs in each time period or step. In most cases this movement will be the one prevailing at the end of the time period or step.

It is well to keep in mind, when considering the operation during angular displacement, that the following conditions are preferable for greatest reliability: (a) That the transmitters of both stations be constructed to have beams which diverge at the same angle and have identical repartition of frequencies in different sections of the beam. (b) That in case directional receivers are used, the receivers of both stations have the same angle of reception. (c) That the angular width of that portion of the transmitted beam carrying the control frequencies is narrower than the angle of reception of the receivers, if the receivers are of the directional type. (d) That angle V, through which the platforms will turn at each step, is determined by contact 15 intermittently energizing coil 30 to actuate switches 33 and 32 to investigate the position of relays 42 and 37 after each step and release their holding circuits to permit them to select the direction of movement of the platform for the next step. This angle V is selected so as to be a fraction of the angle of reception of the receivers, and (e) That the transmitter platform and receiver platform at each of the stations become locked together with the axes of both transmitter and receiver parallel and point in the same directions.

It has been made clear that the receivers of the system need not be directional, but if directional receivers are used, the operation of the mutual orientation system herein described is more delicate than with non-directional receivers, and certain of the above conditions need not be observed. The use of non-directional receivers thus simplifies the system. Regardless of the direction of rotation at any time during a step, a receiver equipped with directional means, and following the above conditions, will remain in condition to receive, as long as the signal is not out of the receiving field. During the correction of orientation, the receivers, if directional in nature, make no use of their directional properties, and operate in the same manner as if they were completely non-directional.

In considering the operation further, let it be supposed that the local station is for instance well aimed toward the distant station, but that the distant station is not pointed exactly towards the local station. Under such conditions, the axis of the beam of reception of the receiver at the local station is not in coincidence with the axis of the transmitted beam from the distant station and the receiver of the local station is in an off-center part of the transmitted beam of the distant station in spite of its correct direction toward the distant station. In other words, the beam axis of the local receiver points at the distant station while the transmitted beam axis is not pointed at the local station, even though the beams partly overlap. The control signals from the distant station which are received at the local station cause the local station to move towards the center of the beam of the distant station and the local station which was well aimed will now move out of direction with regard to the distant station. But, since the local station turns only through an angle V in each step of movement and since angle V determined by contact 15 is only equal to a fraction of the reception angle of the receiver, the receiver of the local station will not move far enough to be out of contact with the distant station. Inasmuch as the receiver at the distant station is in the transmitted beam from the local station, the distant receiver will correct the angular position of the beams of reception and transmission of the distant station to move the beams back in the direction of the local station. This could not occur with such reliability if the operation were not by steps. This is an additional advantage and one of the reasons for which relays 28 and 27 have been used. For the reasons above, the described system of Figure 3 is generally sufficient to assure the operation. A similar operation can be carried out with non-directional receivers, taking into consideration only the axis of the transmitted beam at each station. It is evident that the mutual orientation is more simple with non-directional receivers.

Figure 5A:
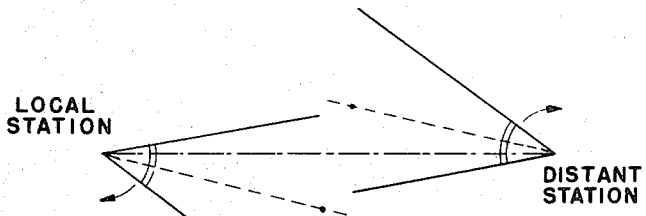
Figures 5a and 5b are two plan views illustrating the same use as in Figures 4a through 4c, but showing certain critical transmitting beam positions.
Figure 5B:
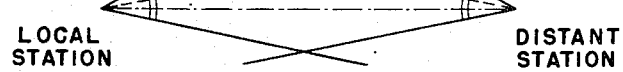
Figure 6:
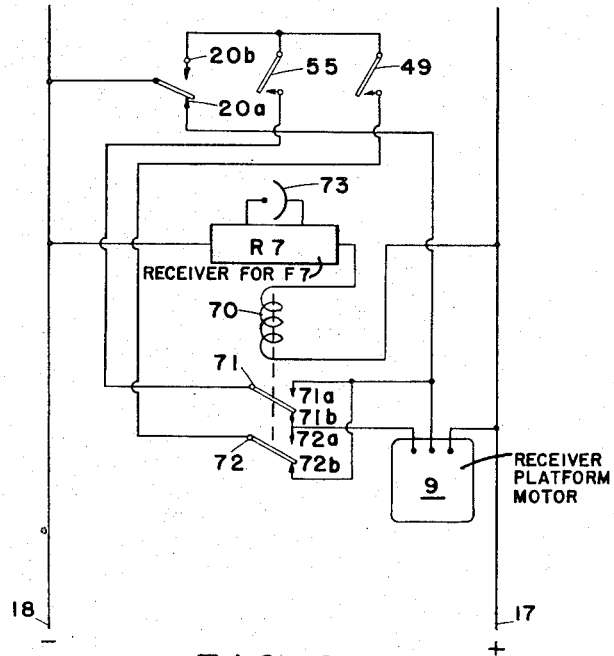
Figure 6 is a view schematically showing the circuit connections of an additional receiver and relay to the circuit of Figure 3 to procure even greater dependability of operation and reversal of rotation.

However, two opposite conditions should be considered when the beams of the distant and local station are moving out of coincidence in opposite directions (Figure 5a): (1) The controls operate to bring back each station towards the center of the beam of the other in the correct direction illustrated in Figure 5a. (2) For an extreme and sudden displacement, there is also the possibility that during contact both the distant and local beam may move out of coincidence in the same direction as illustrated in Figure 5b. Then, if a beam of the type shown in Figure 2 were used, the controls which tend to bring each station by steps towards the center of the beam of the other would operate in the wrong direction at both stations and would accentuate the defect in orientation. It will, therefore, be apparent that the rotation has to be reversed in order to correct for such a condition. This may be accomplished in two ways, namely, by using another frequency and relay as schematically shown in Figure 6 or by using another type of beam such as shown in Figure 7b.

Figure 7A:
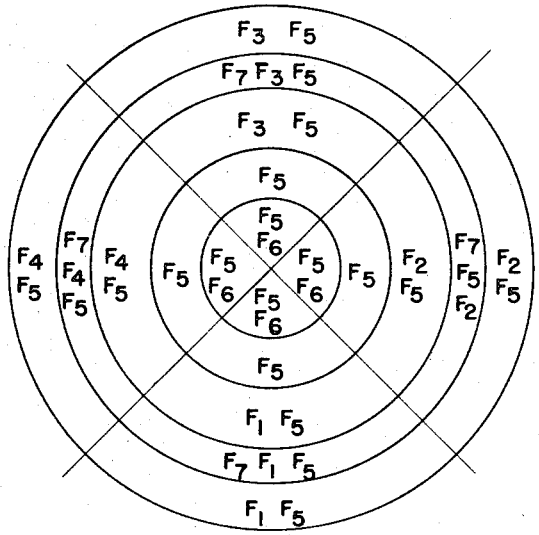
Figures 7a and 7b are two other cross-sections of beam showing two other types of segregation of frequencies in sections of the beam, useful for reversal of rotation.
Figure 7B:
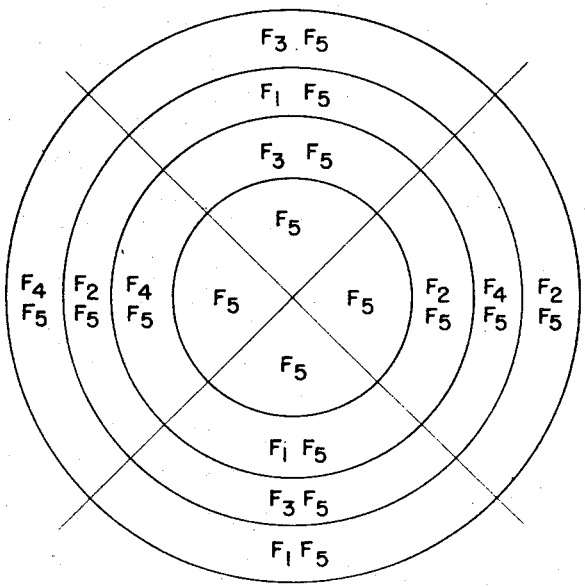

According to the first of these methods, a narrow ring of frequency F—7 as shown in Figure 7a is positioned within the control area of the beam. This is accomplished by placing additional tubes in the projector at each station properly positioned with relation to the other tubes so that the frequency F—7 which it sends forms a ring in the control area of the transmitted beam as shown in Figure 7a. The system shown in Figure 3 is modified at each station by utilizing an additional pick-up 73 and receiver R—7 tuned to the frequency F—7. Referring to the circuit connections schematically shown in Figure 6, these additional elements will now be discussed. Receiver R—7, which is energized by pick-up 73, has one connection with conductor 17 through the operating coil of a relay 70 and another connection directly with conductor 18. Relay 70 actuates a pair of switches 71 and 72 having contacts 71a and 71b and 72a and 72b, respectively. Switch 71 comprises means for selectively connecting contact 55 with either line 56 or line 19, while switch 72 permits connecting contact 49 with either line 19 or line 56. This is in effect a reversing arrangement for controlling rotation of motor 9.

The operation of this circuit is as follows: When frequency F—7 is received by pick-up 73, receiver R—7 energizes the coil of relay 70. This relay reverses the connections for rotation of motor 9 as governed by pick-ups 50 and 36. That is, pick-ups 50 and 36 may be made to operate platform 7 in either clockwise or counterclockwise direction. Now, assuming the positions of the beams are as in Figure 5b, the rotation of motor 9 brings the beam back towards the other station instead of towards the center of the beam of the other station, to maintain contact. This operation takes place by steps as long as frequency F—7 is picked up and the rotation of the motor depends upon which of relays 28 or 27 is energized, i. e. of the position of the receiver in the beam. When frequency F—7 is no longer received, relay 70 is released and normal rotation of motor 9 is re-established. The operation continues by steps as previously explained under the control of pick-ups 36 and 50. Relay 70 has no holding circuit, because, if frequency F—7 has not been picked up for the reason that both stations are out of direction on one side, the platforms will then only turn through an angle V or a fraction of the angle of reception and will, therefore, not lose contact through movement of only a single step. The width of the ring of frequency F—7 being narrow and surrounded (Figure 7a) by a normal correction zone, another correction can take place and cancel or increase the precedent one, if the conditions have remained the same. It has been found that this additional assurance of positive operation is not in all cases necessary when using the system of Figure 3. It has been shown therefore as a modification in Figure 6, and incorporated as a part of a simplified system as shown in Figure 8.

During the motions of the optics, the communications are not interrupted since the diameter of any zone of control signal frequency is smaller or at the maximum equal to the diameter of the main beam F—5 assigned to the intelligence channel. Figure 7a shows a cross-section of a beam using frequency F—7. The center part of the beam in this case is assigned to frequency F—6 if it is planned to stop the motor 9, when the beams are in good orientation, by using relay 80 of Figure 3 as described previously herein.

The second method for obtaining reverse rotation is as follows: Reverse rotation can be obtained very simply without the use of frequency F—7 by using a beam as shown in Figure 7b wherein frequencies F—2 and F—4 are alternated in one order on one side of the beam in the horizontal plane, and are in the reverse order on the opposite side of the beam. The reverse rotation in the horizontal plane is obtained directly through pick-up 50 or 36 of Figure 3. The same effect can be obtained in the vertical plane using frequencies F—1 and F—3. With either of the beams shown in Figures 7a or 7b, if the respective positions of the beams of the two stations are as shown in Figure 5b, the receiver will remain in the control zone and communication of intelligence maintained even through the beam axes are not in exact coincidence.

Figure 8:
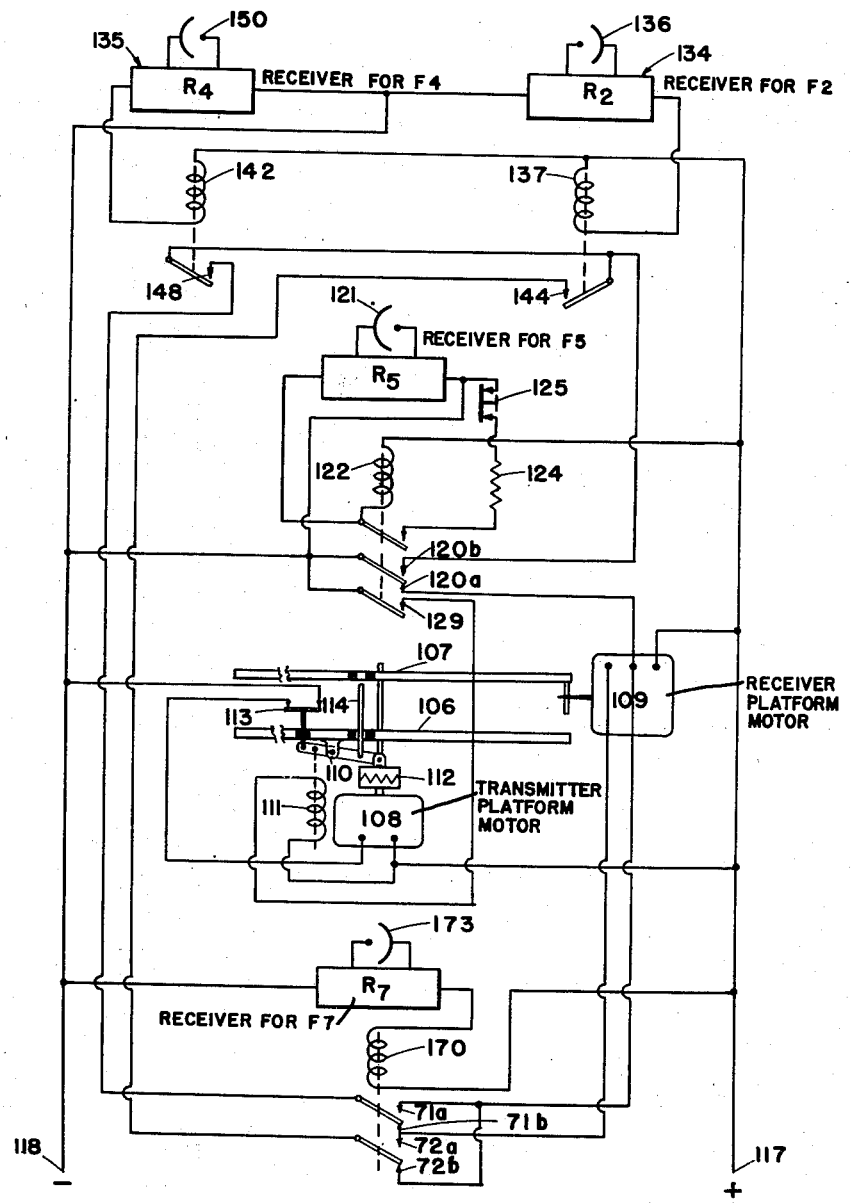
Figure 8 is a view similar to Figure 3, but schematically showing a simplified circuit connection.

A simplified system is shown in Figure 8. In this system the orienting operation is not carried out by steps but takes place in one movement. Motor 109 corresponding to motor 9 of Figure 3 does not stop until the control signal F—2 or F—4 is no longer received. In this system, a preferred arrangement would be: (a) the angle of the control zone of the transmitted beam is selected so as to be smaller than the beam angle of the receiver beam, so that the effects of directional properties of the receiver are mostly eliminated during the mutual orientation operation due to the ability of the receiver to pick up the control signal frequency even when the receiver is not directed exactly toward the control zone, (b) the zone of frequency F—7 is inside the main control zone. The circuit in Figure 8 is in general similar to Figure 3, except as will now be discussed. Relay 122 has the same function as relay 22 in Figure 3 in switching from search to orientation control. Relays 137 and 142 are in this arrangement not provided with holding circuits, but instead have single contacts 144 and 148, respectively, which take the place of contacts 49 and 55 in Figure 3 and serve to control the direction of rotation of the motor 109. One or the other of the contacts 144 and 148 remain closed as long as a signal is received by pick-up 136 or pick-up 150. Pick-up 173 and relay 170 are essential in this system due to the omission of the step-like movement, and serve to reverse the operation of motor 109 by relays 137 and 142. Thus, pick-up 136 will cause rotation of motor 9 in either of two directions depending upon whether or not frequency F—7 is being received. The same applies to pick-up 150. Of course, under all conditions, pick-ups 136 and 150 cause rotation of motor 109 in opposite directions. This system lacks the advantageous damping feature of the previously described system. However, the correction in orientation is complete in one movement but only up to the limit of the width of the control zone outside of which there is no further reception of control frequencies. In the system of Figure 3, as relays 42 and 37 were locked in by holding circuits, orienting movements might take place even in the center zone in the case where the control signals F—1, F—2, F—3, F—4 are not present in the center of the beam as in Figure 2.

Figure 9A:
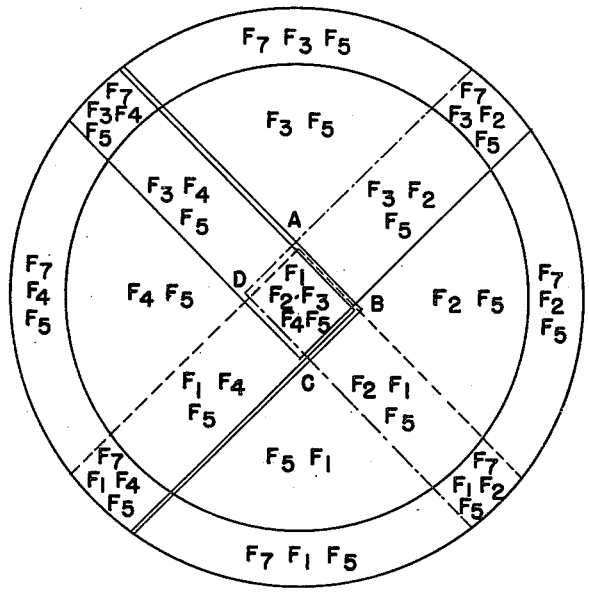
Figures 9a and 9b are cross-sectional views of other beams utilizing overlapping beam sections, which are contemplated for use in the present invention.
Figure 9B:
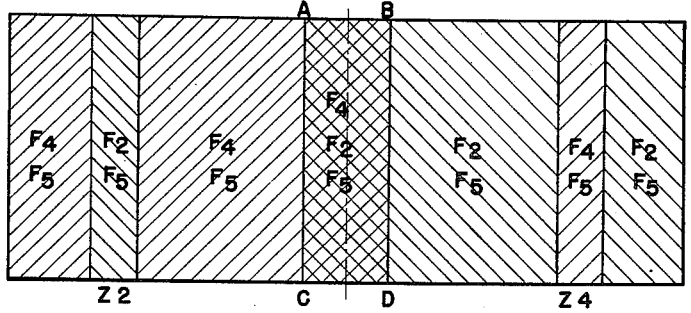

Other useful types of beam cross-sections with overlapping sectors are shown in Figures 9a and 9b. Figure 9a shows overlapping sectors which cause the orienting movement to stop when frequencies F—2 and F—4 are received at the same time, which indicates that the beams are correctly oriented. This disposition includes the frequency F—7 for causing reverse operation.

Figure 10:
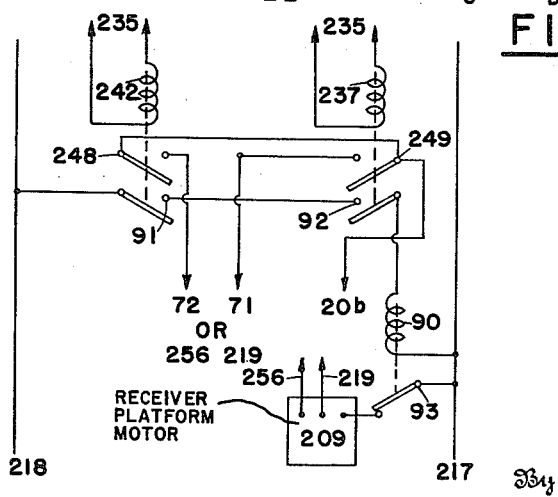
Figure 10 is schematic circuit showing a modification to be added to the arrangements shown in Figure 3 or Figure 8, when overlapping beam sections are used.

This type of beam can be used with the circuits of Figures 3 or 8 modified in such a way as to stop the orienting movement when an overlapping beam area is received. As shown in Figure 10, relays 242 and 237 corresponding to relays 42 and 37 are provided with additional contacts 91 and 92 so that when both relays are energized by reception of the overlapping frequencies, contacts 91 and 92 are closed to operate the energizing circuit of relay 90 which opens contact 93 in the line connecting motor 209 and conductor 217, thereby opening the circuit of motor 209. With this disposition, the orientation would place the station in the central area ABCD of the beam shown in Figure 9a.

Figure 9b shows another type of composite beam. This beam is composed of beam sectors having straight boundaries in which frequencies F—5 serve for communication and F—4 and F—2 for orientation control in azimuth only. As in Figure 7b, this disposition uses frequencies F—2 and F—4 for reverse operation so that in zones Z—2 and Z—4, relay 70 is not needed. The system uses the relay 90 of Figure 10 in the central area to stop the motor 9, when the beams are correctly oriented. The system uses only three frequencies and very simple shapes of tubes due to the fact that the beam is rectangular. By using two rectangular beams crossing each other at right angles, control both in the vertical and in the horizontal can be provided.

It is believed unnecessary to discuss further the various combinations of beam cross-sections with the circuit of Figure 3, Figure 6, Figure 10, and other circuits which can be formulated using my system, as they will now be clear to one skilled in the electronic arts.

The following will be of advantage to those desiring to utilize my invention to the utmost. It is clear to one reading my description of the invention that the same optical system is used during the search on the whole horizon and during the normal operation of transmitting intelligence after contact. Thus, the same elements and settings of transmitter and sensitivity of the receiver are kept during both operations, which is a considerable advantage from the standpoints of simplicity, reliability, and size compared to other systems. The different frequencies operating the mechanism of orientation constitute by themselves a recognizing signal. They can be modulated by a signal or a combination of signals, thereby improving the security from undesirable detection without affecting the signal assigned for the communication of intelligence. Thus, it is possible to prevent the devices from becoming locked-in with some enemy receiver or transmitter, and permits the introduction of signal combinations for preventing the jamming of the remote control operation. In other words, the present invention when used in combination with the system of my above-mentioned application Serial No. 645,626 enables the system to distinguish desired from undesired contacts.

Supposing the constant intensity system in telegraphy or telephony is used with the system, one receiver can receive the frequency F—5 of the telegraph or telephone signal and a second receiver can receive the frequency F—6 which carries complementary keying or telephone signals. The sum of these two signals F—5 plus F—6 is a constant signal after detection which can be used to work the relay 22. This system in itself constitutes a means for distinguishing desirable from undesirable contacts, for distinguishing friend from foe, for instance. If additional security is desired, it is simple to modulate the constant intensity signal F—5 plus F—6 to an ultra sonic frequency in the center of the beam, thus getting a special signal which can only be picked up by the correct receiver and used in the orientation system for instance to release the holding circuits of relays 42 and 37 by means of an additional relay 80 when correct orientation is obtained in the center beam. In short, a real automatic recognizing signal is obtained and it can act on the relay according to any combination of the above factors. The same combination of factors can be applied to any remote control application such as of a torpedo or other guided missiles giving great security against jamming.

It is a characteristic of my system of orientation of two stations that it works only in a duplex, the transmitter of one station being remotely controlled by the transmitter beam of the other. Each receiver, after contact, becomes locked with the transmitter which is at the same station so that the orientation of one station depends on the location of this station with respect to the center of the transmitter beam of the other, in other words, it depends upon the frequency which is picked up, the received frequency varying according to the portion of the beam which is received, as has been explained previously herein.

The system can be used with any radiation whose propagation is approximately the same as light.

On account of the large beam angle permitted by the system disclosed in my application Serial No. 645,626, it is possible to omit consideration of vertical search and orientation and to use the present search and orientation system only in the horizonal plane, thereby simplifying the equipment. The platforms in this case can be mounted with suspensions of the "cardan" type. The effects of vertical motion can be neglected and only two control frequencies as in Figure 9b are used instead of the four shown in Figure 2.

It is sometimes convenient to excite the sectors of the tubes at the transmitters by induction for instance by using single circular tube having thin wires around various portions of the tube. Each portion can be excited at desired frequencies.

The shift in the bands of light radiation referred to in my above-mentioned co-pending application could be used in combination with selective light pick-up devices instead of modulating the light radiation at frequencies F—1, F—2, etc., each sector being assigned to a different frequency band of light. The same effect could be obtained by using light polarized in different planes, the planes being varied in the different beam sectors by means of a plurality of filters at the transmitter.

A system using control by thyratrons instead of a combination of relays can very easily be made, but the amount of material necessary seems to be larger and space and weight would be increased. In this case, the coils of relays 42 and 37 are replaced by resistors, the drop in tension across those resistors being used to actuate the thyratrons.

Thus, it will be realized that while relays have been utilized in the invention as herein described for accomplishing control of the motors for rotating the transmitter and receiver at each station, the invention is not to be thus limited, since it will be apparent to those skilled in the art that various other control devices such as, vacuum tubes and the like, may be utilized for controlling the motors.

The Government of the United States has a license option under paragraph (a) Article 31 of Contract NObs—12911.

What I claim is:

1. A search system for a radiation transmitting and receiving station comprising a beam transmitter, a beam receiver, and means for rotating the transmitter and receiver at different speeds to respectively sweep their effective axes through azimuth angles.

2. A search system for a radiation transmitting and receiving station comprising a beam transmitter, a beam receiver, and means for rotating the transmitter and receiver at different speeds to respectively sweep their effective axes through azimuth angles, the rotational speed of the receiver being the greater.

3. A search system for a radiation transmitting and receiving station comprising a beam transmitter, a beam receiver, and means for rotating the transmitter and receiver at different speeds to respectively sweep their effective axes through azimuth angles, the speed of rotation of the transmitter relative to that of the receiver being in the ratio of one to ten.

4. A search system for a radiation transmitting and receiving station comprising a beam transmitter, a beam receiver, means for normally rotating the transmitter and receiver at different speeds to respectively sweep their effective axes through azimuth angles, and means responsive to a characteristic of a received beam for interlocking the transmitter and receiver together for rotational movement at the same speed.

5. A search system for a radiation transmitting and receiving station comprising a beam transmitter, a beam receiver, means for normally rotating the transmitter and receiver at different speeds to respectively sweep their effective axes through azimuth angles, and means responsive to a characteristic of a beam and operable upon reception of a beam by a receiver for interlocking the transmitter and receiver together with their axes trained parallel and in the same direction and for rotational movement at the same speed.

6. An orienting system for a radiation transmitting and receiving station comprising a transmitter, a receiver arranged to receive a beam from a distant source, electric power means operative to rotate the receiver, a set of control devices responsive to a characteristic of a received beam for rotating the receiver in one direction, another set of control devices responsive to another characteristic of the received beam for rotating the receiver in an opposite direction, and means operable upon the successive actuation of said sets of control devices for de-energizing one set when the other set is actuated.

7. An orienting system for a radiation transmitting and receiving station comprising a transmitter, a receiver arranged to receive a beam from a distant source, electric power means operable to rotate the receiver in opposite directions, circuit control means operable to energize the power means for each direction of rotation selectively in response to characteristics of a received beam, and means for momentarily interrupting the control means circuit at angularly spaced intervals in the rotation of the receiver, whereby the rotation of said receiver takes place in steps.

8. An orientation system for a radiation transmitting and receiving station, comprising a transmitter, a receiver having a known angle of reception and arranged to receive a beam from a distant source, electric power means operable to rotate the receiver in opposite directions, circuit control means operable to energize the power means for each direction of rotation selectively in response to characteristics of a received beam, and means for causing said rotation to take place by angular steps limited to a fraction of the angle of reception of the receiver.

9. An orienting system for a radiation transmitting and receiving station comprising a transmitter, a receiver arranged to receive a beam from a distant source, electric power means operative to rotate the receiver, a first set of controls responsive to a characteristic of a received beam and capable of remaining polarized in different ways depending upon which of the signals is last received, a second set of controls for rotating the receiver by steps in the direction determined by the polarization of the first set of controls during the last preceding step, means co-operating with said second set of controls for continuing the rotation prevailing at the time of operation of said co-operating means, independently of the first set of controls during one complete step of rotation, whereby the orientation for the next step is corrected in the direction which corresponds to the signal which was last received during the precedent step.

10. An orienting system for a radiation transmitting and receiving station comprising a directional transmitter, a receiver arranged to receive a beam from a distant source, electric power means operable to rotate the receiver in opposite directions, control means operable to energize the power means for each direction of rotation selectively in response to characteristics of a received beam, and means responsive to a characteristic of the received beam to stop the rotation and render said electric power means ineffective when the directional axis of the transmitter has a correct orientation and the receiver is in the center part of the received beam.

11. An orienting system for a radiation transmitting and receiving station comprising a transmitter, a receiver arranged to receive a beam from a distant source, electric power means operable to rotate the receiver in opposite directions, control means operable to energize the power means for each direction of rotation selectively in response to characteristics of a received beam, and a set of control devices operable when the receiver momentarily crosses a part of the beam to reverse the direction of rotation brought about by said control means.

12. A search and orienting system for two distantly located stations, comprising at each of said stations a transmitter arranged to project a beam of radiant energy, a receiver arranged to receive the beam from the distant station, means for normally rotating the transmitter and receiver at different speeds to sweep their respective axes through an azimuth angle, and means responsive to a characteristic of a received beam and operable immediately upon reception of a beam by a receiver for interlocking the transmitter and receiver at each station together for rotational movement at the same speed and pointing the same direction, whereby contact is established between the two stations.

13. A search and orienting system for two distantly located stations, comprising at each of said stations a transmitter arranged to project a beam of radiant energy, a receiver arranged to receive the beam from the distant station, means for normally rotating the transmitter and receiver at different speeds to sweep their respective axes through an azimuth angle, means responsive to a characteristic of a received beam for interlocking the transmitter and receiver together for rotational movements at the same speed pointing in the same direction and other means responsive to characteristics of the received beam for affecting the angular relation between the directional axis of the receiver and the received beam to cause mutual orientation of the stations.

14. A search and orienting system for two distant stations, comprising at each station a transmitter including one or more discharge tubes operable to project a beam of radiation having a plurality of zones, each zone having one or more frequencies, means for supplying radio frequency currents to said tubes, a receiver including one or more radiation sensitive devices adapted to receive said radiation, one or more radio receivers for said frequencies connected to said radiation sensitive devices, electric power means for rotating the transmitter and receiver, and a set of control devices for energizing said power means in one direction or the other in accordance with the frequency characteristic of the signal received by said radiation sensitive devices and the position of the receiver in the transmitter beam of the other station, whereby the orientation of each station is effected by the orientation of the other resulting in the maintenance of contact between the two stations.

15. In a remote control system, an optical system having in its focus plane a light source having a substantial cross-sectional area and composed of an assembly of light transmitting tubes arranged in zones, means for causing said tubes to radiate at a plurality of different frequencies, one or more of which frequencies may be modulated, to produce a light beam the cross-section of which is the reverse image of the composite source, whereby the beam has corresponding zones of different frequencies in its cross-sectional area.

16. A system for projecting a composite beam of light having a cross-section composed of a plurality of zones, said zones carrying light modulated at one or more different frequencies, said system comprising a plurality of light emitting discharge tubes positioned in stacked relation, means for exciting said tubes at one or more radio frequencies, and an optical system for converting the light radiated into a beam, whereby the transparency of each of said tubes to the radio frequency modulated light emitted by the other tubes results in a beam of the desired cross-sectional characteristics.

17. A system for projecting a composite beam of light having a cross-section composed of a plurality of zones, said zones carrying light modulated at one or more different frequencies, said system comprising a plurality of light emitting discharge tubes positioned in stacked relation, means for exciting said tubes at one or more radio frequencies, an optical system for converting the light radiated into a beam, whereby the transparency of each of said tubes to the radio frequency modulated light emitted by the other tubes results in a beam of the desired cross-sectional characteristics, and means for causing certain of said tubes exciting means to operate for remote control purposes and others for the transmission of communications, the radiation caused by both types of exciting means being in the same portions of the beam.

18. A remote control system comprising a light radiation transmitter arranged to project a beam of light radiation having a plurality of zones, said zones comprising light modulated at different radio frequencies, remotely positioned means for receiving the beam from the light transmitter, remote control devices at said receiving means, and means responsive to said radio frequency modulated light of the received beam for selectively energizing said remote control devices, the received frequency and the action of the remote control devices varying according to the location of the receiving means in the light beam of the transmitter.

19. A search and orienting system for two distantly located stations, each including a receiver having a known angle of reception, a transmitter arranged to project a beam of radiation having control zones of radiation separated from the axis of the beam by less than half of the angle of reception of the receiver, electric power means operable to rotate the directional system of the receiver in opposite directions, control means operable by the radiation in said control zones to energize the power means for each direction of rotation selectively so that the direction of rotation is determined by the position of the receiver in the beam, whereby, after contact of the transmitted beam with a receiver, said control means is operated before the transmitted beam can move out of the angle of reception of the receiver.

20. A mutual orientation system for establishing and maintaining communication contact between a pair of spaced stations each capable of translational movement of a nature unknown to the other, comprising directional beam transmitters at each station, said beams forming a signal transmission channel between the stations when the beams are substantially in coincidence, and means utilizing the directional properties of said transmitters and responding to the particular cross sectional beam portion received at each station, for mutually orienting said transmitters to maintain coincidence of said beams, said means operating independently of any variations in the intensities of the beams.

21. A system as set forth in claim 20, said means including receiving means at each station, said beams having varying frequency characteristics in the beam cross section, resulting in the said response according to the particular cross sectional beam portion received by said receiving means.

22. A system as set forth in claim 20, said means including receiving means at each station, said beams having a plurality of component frequencies, resulting in said response according to the particular cross sectional beam portion received by said receiving means.

23. A mutual orientation system for establishing and maintaining communication contact between a pair of spaced stations each capable of translational movement of a nature unknown to the other, comprising at each station a transmitter emitting a directional beam of radiant energy having a plurality of component frequencies segregated in cross sectional zones of the beam, means at each station for receiving the beam from the other station, and means at each station variably operable according to the frequency of radiation contained in the beam zone received by the receiving means of the station, for mutually orienting the directional axes of the transmitted beams to maintain contact between the stations independently of any variations in the intensities of said beams and independently of any directional characteristics of the receiving means.

24. A system for the mutual orientation of two distantly located stations, each capable of translational motion of a nature unknown to the other, comprising at each station a transmitter for projecting a beam of radiant energy having a constant apparent intensity and having a plurality of different modulated radio frequencies segregated in cross sectional zones of the beam, non directional receiving means at each station, and means variably operative in accordance with whichever beam frequency is received for orienting each transmitter with respect to the center of the received beam from the other transmitter to maintain mutual orientation of the transmitters and contact between stations.

25. A system as set forth in claim 20, said means including receiving means at each station, said beams having a plurality of different component frequencies, resulting in said response according to the particular cross sectional beam portion received by said receiving means.

26. A system as set forth in claim 20, said means including receiving means at each station, said beams having a plurality of different component frequencies, resulting in said response according to the particular cross sectional beam portion received by said receiving means, and means for transmitting intelligence over one of said component frequencies.

27. A system as set forth in claim 20, said means including receiving means at each station, said beams having a plurality of different component frequencies, at least one of which is distinct from the others, resulting in said response according to the particular beam cross sectional beam portion received by said receiving means, and means for transmitting intelligence over said distinct frequency.

28. A mutual orientation system for establishing and maintaining communication contact between a pair of spaced stations each capable of translational movement of a nature unknown to the other, comprising directional beam transmitters at each station, said beams forming a signal transmission channel between the stations when the beams are substantially in coincidence, means for imposing on said beams a plurality of beam components of different radio frequencies, said components being located in particular cross sectional portions of the beam, receiving means at each station, and means at each station variably operable in accordance with the particular beam component frequency received for mutually orienting the directional axes of the beams to maintain contact between the stations independently of any variations in intensity of the beams and independently of any directional characteristics of the receiving means.

29. A mutual orientation system for establishing and maintaining communication contact between a pair of spaced stations each capable of translational movement of a nature unknown to the other, comprising directional beam transmitters at each station, said beams forming a signal transmission channel between the stations when the beams are substantially in coincidence, receiving means at each station, said beams comprising a plurality of different frequencies, some of which are located in cross sectional beam portions disposed in quadrature, and means at each station variably operable in accordance with the particular component frequency received, for mutually orienting the directional axes of the beams to maintain contact between the stations independently of any variations in intensity of the beams and independently of any directional characteristics of the receiving means.

30. A mutual orientation system for establishing and maintaining communication contact between a pair of spaced stations each capable of translational movement of a nature unknown to the other, comprising directional beam transmitters at each station, said beams forming a signal transmission channel between the stations when the beams are substantially in coincidence, receiving means at each station, said beams comprising a plurality of different radio frequencies, some of which are disposed in overlapping cross sectional beam portions, control means at each station associated with said receiving means and variably responsive in accordance with the portion of the beam received for causing mutual orientation of said receiving means with respect to the centers of the transmitted beams, and means associated with said receiving means and responsive to the reception of the beam portions containing overlapping frequencies for disabling said control means when the associated receiving means receives overlapping frequencies, whereby orientation of the associated receiver is discontinued during the time that it receives overlapping frequencies.

31. The system of claim 30 in which said receiving means are non-directional.

32. A mutual orientation system for establishing and maintaining communication contact between a pair of spaced stations each capable of translational movement of a nature unknown to the other, comprising directional beam transmitters at each station, said beams forming a signal transmission channel between the stations when the beams are substantially in coincidence, receiving means at each station, said beams each comprising a plurality of different component frequencies, certain of said component frequencies being disposed in at least one annular cross sectional portion of the beam, and means at each station associated with said receiving means and operable in response to the frequencies in said annular beam portions for causing mutual orientation of the receivers with respect to the received beams when the frequencies in said annular portions are being received.

33. A system as set forth in claim 32, said last named means including a control for each beam emitting source operable by the receiving means, whereby the sources are mutually oriented to maintain each beam axis inside the annular cross sectional portion of the other beam.

34. An orientation system for a radiation transmitting and receiving station, comprising a transmitter for sending a directional beam having different frequencies located in cross sectional portions of the beam, a receiver, means for rotating said transmitter, means for rotating said receiver in either of two opposite directions independently of the transmitter, means operable upon reception of a predetermined frequency to lock said transmitter to said receiver for rotation by said receiver rotating means, and means operable in response to reception of frequencies located in predetermined portions of the received beam for causing said receiver and transmitter to rotate together in steps of an angular width fractionally related to the angle of reception of the receiver, the direction of such stepped movement being controlled by the position of the receiver in the received beam, whereby orientation is carried out independently of any directional properties of the receiver, and whereby damping of operation is achieved by said stepped movement.

35. A search and mutual orienting system for providing and maintaining communication contact between two spaced stations each capable of translational movement of a nature unknown to the other, comprising, at each station, a receiver having a known angle of reception, electric power means for rotating said receiver in either of two opposite directions of rotation, a transmitter for projecting a beam of radiation having in its cross section control zones of radiation spaced from the axis of the beam, but included within an angle smaller than said angle of reception, means for interlocking the transmitter and the receiver for rotation together with their axes parallel and pointing in the same direction, and control means variably operable by reception at the receiver of radiation in said control zones to energize said power means for rotation of the receiver and transmitter in whichever direction is indicated by the zone received, independently of any directional properties of the receiver, whereby, after contact of a transmitted beam with a receiver, said control means at the receiving station operates as long as a transmitted beam is in contact with the receiving station.

GUY TOUVET.

REFERENCES CITED

The following references are of record in the file of this patent:

UNITED STATES PATENTS

| Number | Name | Date |
| --- | --- | --- |
| 2,142,648 | Linder | Jan. 3, 1939 |
| 2,152,329 | Schussler | Mar. 28, 1939 |
| 2,203,807 | Wolff | June 11, 1940 |
| 2,234,244 | Gossel | Mar. 11, 1941 |
| 2,245,660 | Feldman et al. | June 17, 1941 |
| 2,257,319 | Williams | Sept. 30, 1941 |
| 2,297,395 | Erben | Sept. 29, 1942 |
| 2,414,469 | Isbister | Jan. 21, 1947 |
| 2,419,525 | Alford | Apr. 29, 1947 |
| 2,449,977 | Busignies | Sept. 28, 1948 |